US012713257B2

(12) United States Patent
Chiou

(10) Patent No.: US 12,713,257 B2
(45) Date of Patent: Aug. 18, 2026

(54) METHOD AND USER EQUIPMENT FOR PERFORMING CELL MEASUREMENT

(71) Applicant: MEDIATEK INC., Hsin-Chu (TW)

(72) Inventor: Mu-Ming Chiou, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 350 days.

(21) Appl. No.: 18/230,682

(22) Filed: Aug. 7, 2023

(65) Prior Publication Data

US 2024/0064542 A1 Feb. 22, 2024

Related U.S. Application Data

(60) Provisional application No. 63/371,887, filed on Aug. 19, 2022.

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
CPC .............................. H04W 24/08; H04W 24/10
USPC .......................................................... 370/252
See application file for complete search history.

(56) References Cited

U.S. PATENT DOCUMENTS 12,082,057 B2 * 9/2024 Shi ........................ H04W 76/16
12,160,874 B2 * 12/2024 Wei ....................... H04W 72/27
12,193,034 B2 * 1/2025 Harada ................. H04W 72/30
12,231,183 B2 * 2/2025 Bai ....................... H04B 17/318
12,250,649 B2 * 3/2025 Harada ................. H04W 48/10
12,256,347 B2 * 3/2025 Zhu ....................... H04J 11/0073
12,256,427 B2 * 3/2025 Fujishiro ............... H04W 76/18
12,273,834 B2 * 4/2025 Teyeb ................... H04W 76/27
12,284,666 B2 * 4/2025 Li ......................... H04W 72/542
12,317,202 B2 * 5/2025 Cui ....................... H04L 5/0048
12,323,931 B2 * 6/2025 Akl ....................... H04W 24/10
12,324,045 B2 * 6/2025 Di Girolamo ........ H04W 76/19
12,335,179 B2 * 6/2025 Horn ..................... H04L 5/0048
12,348,457 B2 * 7/2025 Jin ........................... H04L 5/023
12,363,599 B2 * 7/2025 Cui ....................... H04W 24/10
12,363,621 B2 * 7/2025 Cui ....................... H04L 5/0091
12,376,050 B2 * 7/2025 Ly ........................... H04L 5/001
12,389,248 B2 * 8/2025 Wang .................... H04W 72/23

(Continued)

FOREIGN PATENT DOCUMENTS

EP 3843448 A1 * 6/2021 ............ H04W 24/08
EP 4415425 A1 * 8/2024 ......... H04B 7/18519
WO WO-2021051288 A1 * 3/2021 ............ H04W 72/04
WO WO-2025150784 A1 * 7/2025 ............ H04W 48/16

OTHER PUBLICATIONS

J. Liu et al., “Initial Access, Mobility, and User-Centric Multi-Beam Operation in 5G New Radio,” in IEEE Communications Magazine, vol. 56, No. 3, pp. 35-41, Mar. 2018. (Year: 2018).*

(Continued)

*Primary Examiner* — Melvin H Pollack
(74) *Attorney, Agent, or Firm* — Winston Hsu

(57) ABSTRACT

A method for performing a cell measurement, fora user equipment (UE) of a wireless communication network, incudes applying multiple measurement functions at an identical synchronization signal block (SSB) occasion or in a SSB-based Radio Resource Management (RRM) measurement timing configuration (SMTC) window.

4 Claims, 4 Drawing Sheets

(56) References Cited

U.S. PATENT DOCUMENTS

| | | | | |
|---|---|---|---|---|
| 12,395,291 | B2 * | 8/2025 | Zhang | H04W 74/0808 |
| 12,396,027 | B2 * | 8/2025 | Kazmi | H04L 27/0006 |
| 12,425,288 | B2 * | 9/2025 | Chou | H04L 41/5051 |
| 12,432,737 | B2 * | 9/2025 | Sosnin | H04L 5/0044 |
| 12,445,873 | B2 * | 10/2025 | Jiang | H04W 24/10 |
| 12,446,070 | B2 * | 10/2025 | Siomina | H04W 74/0816 |
| 12,457,581 | B2 * | 10/2025 | Fujishiro | H04W 8/22 |
| 12,490,291 | B2 * | 12/2025 | Rao | H04B 7/06952 |
| 2020/0413276 | A1 * | 12/2020 | Zhu | H04L 5/0053 |
| 2021/0385765 | A1 * | 12/2021 | Cheng | H04W 56/001 |
| 2023/0121806 | A1 * | 4/2023 | Li | H04W 24/10 370/329 |
| 2024/0214888 | A1 * | 6/2024 | Li | H04W 36/00 |
| 2024/0413870 | A1 * | 12/2024 | Li | H04B 7/0626 |
| 2024/0413898 | A1 * | 12/2024 | Cui | H04B 7/18513 |
| 2025/0081101 | A1 * | 3/2025 | Soldati | H04W 36/0066 |
| 2025/0081150 | A1 * | 3/2025 | Keating | H04W 24/08 |
| 2025/0119777 | A1 * | 4/2025 | Bergström | H04W 24/02 |
| 2025/0150876 | A1 * | 5/2025 | Hu | H04W 72/0457 |
| 2025/0176065 | A1 * | 5/2025 | Cui | H04W 76/28 |
| 2025/0220719 | A1 * | 7/2025 | Ly | H04W 74/0833 |
| 2025/0280315 | A1 * | 9/2025 | Tao | H04W 8/24 |

OTHER PUBLICATIONS

M. Lauridsen, L. L. Sanchez, D. Laselva and J. Kaikkonen, "Study of Paging Enhancements for UE Energy Saving in 5G New Radio," 2021 IEEE 93rd Vehicular Technology Conference (VTC2021-Spring), Helsinki, Finland, 2021, pp. 1-6. (Year: 2021).*

Y.-N. R. Li, M. Chen, J. Xu, L. Tian and K. Huang, "Power Saving Techniques for 5G and Beyond," in IEEE Access, vol. 8, pp. 108675-108690, 2020. (Year: 2020).*

D. Laselva et al., "UE Measurements Relaxation for UE Power Saving in 5G New Radio," 2021 IEEE 94th Vehicular Technology Conference (VTC2021-Fall), Norman, OK, USA, 2021, pp. 1-6. (Year: 2021).*

M.-Y. Yun, J. Kim, D. You and M.-S. Lee, "Main features of 5G New Radio for Non-Terrestrial Networks," 2021 International Conference on Information and Communication Technology Convergence (ICTC), Jeju Island, Korea, Republic of, 2021, pp. 1474-1478. (Year: 2021).*

L. Miuccio, D. Panno and S. Riolo, "Joint Control of Random Access and Dynamic Uplink Resource Dimensioning for Massive MTC in 5G NR Based on SCMA," in IEEE Internet of Things Journal, vol. 7, No. 6, pp. 5042-5063, Jun. 2020. (Year: 2020).*

* cited by examiner

METHOD AND USER EQUIPMENT FOR PERFORMING CELL MEASUREMENT

CROSS REFERENCE TO RELATED APPLICATIONS

This application claims the benefit of U.S. Provisional Application No. 63/371,887, filed on Aug. 19, 2022. The content of the application is incorporated herein by reference.

BACKGROUND

With the growing demand for ubiquitous computing and networking, various wireless technologies have been developed, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

These wireless technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

The operations include the Discontinuous Reception (DRX) operation and cell measurements for Radio Resource Management (RRM). Specifically, the cell measurements are configured via the Synchronization Signal Block (SSB)-based RRM Measurement Timing Configuration (SMTC), and SMTC windows are introduced to notify a user equipment (UE) regarding the measurement periodicity and timings of SSBs that the UE can use for measurement.

However, conventionally, only one measurement method may be applied at the same SSB occasion or in an SMTC window, different measurement methods should be arranged at different SSB occasions or in different SMTC windows.

Therefore, improvements are necessary to the conventional technique.

SUMMARY

In light of this, the present invention provides a method and an user equipment for performing a cell measurement to avoid unnecessary measurements at a SSB occasion or in a SMTC window, and reduces the power consumption of the UE.

An embodiment of the present invention provides a method for performing a cell measurement, for a user equipment (UE) of a wireless communication network, comprises applying multiple measurement functions at an identical synchronization signal block (SSB) occasion or in a SSB-based Radio Resource Management (RRM) measurement timing configuration (SMTC) window.

Another embodiment of the present invention provides a user equipment (UE) of a wireless communication network, comprises a wireless transceiver, configured to perform wireless transmission and reception to and from a service network; and a controller, configured to receive a measurement configuration from the service network via the wireless transceiver, and perform a cell measurement via the wireless transceiver; wherein the cell measurement is performed by applying multiple measurement functions at an identical synchronization signal block (SSB) occasion or in a SSB-based Radio Resource Management (RRM) measurement timing configuration (SMTC) window.

These and other objectives of the present invention will no doubt become obvious to those of ordinary skill in the art after reading the following detailed description of the preferred embodiment that is illustrated in the various figures and drawings.

DETAILED DESCRIPTION

The following description is made for the purpose of illustrating the general principles of the application and should not be taken in a limiting sense. It should be understood that the embodiments may be realized in software, hardware, firmware, or any combination thereof. The terms "comprises, "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
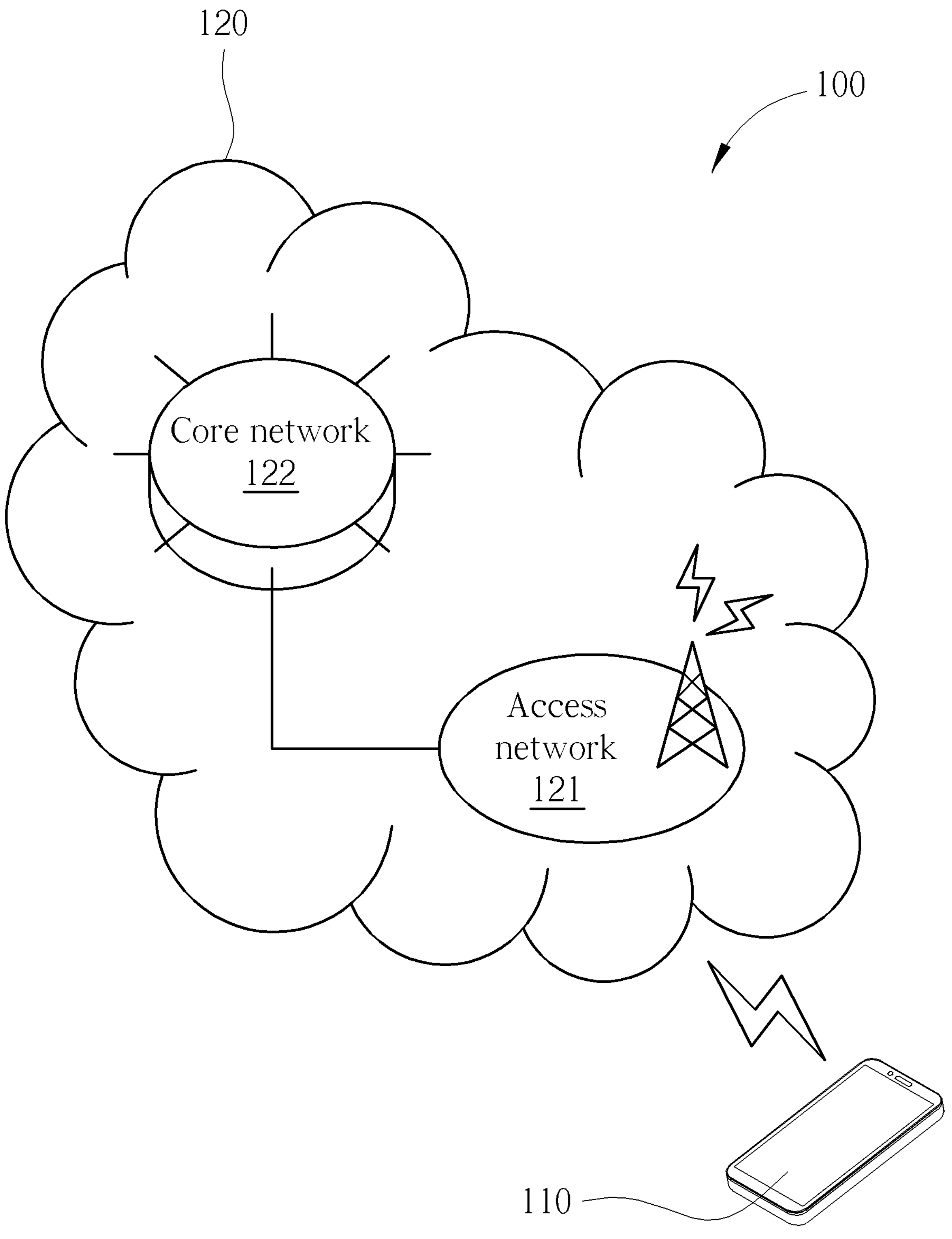
FIG. 1 is a schematic diagram of a wireless communication network according to an embodiment of the present invention.

FIG. 1 is a schematic diagram of a wireless communication network 100 according to an embodiment of the present invention.

As shown in FIG. 1, the wireless communication network 100 may include a user equipment (UE) 110 and a service network 120, wherein the UE 110 may be wirelessly connected to the service network 120 for obtaining mobile services and performing cell measurements on the cell(s) of the service network 120.

The UE 110 may be a feature phone, a smartphone, a panel Personal Computer (PC), a laptop computer, or any wireless communication device supporting the wireless technology (e.g., the 5G NR technology) utilized by the service network 120. In another embodiment, the UE 110 may support more than one wireless technology. For example, the UE may support the 5G NR technology and a legacy 4G technology, such as the LTE/LTE-A/TD-LTE technology.

The service network 120 includes an access network 121 and a core network 122. The access network 121 is responsible for processing radio signals, terminating radio protocols, and connecting the UE 110 with the core network 122.

The core network 122 is responsible for performing mobility management, network-side authentication, and interfaces with public/external networks (e.g., the Internet). Each of the access network 121 and the core network 122 may comprise one or more network nodes for carrying out said functions.

In one embodiment, the service network 120 may be a 5G NR network, and the access network 121 may be a Radio Access Network (RAN) and the core network 122 may be a Next Generation Core Network (NG-CN).

A RAN may include one or more cellular stations, such as next generation NodeBs (gNBs), which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

A 5G cellular station may form one or more cells with different Component Carriers (CCs) for providing mobile services to the UE 110. For example, the UE 110 may camp on one or more cells formed by one or more gNBs or TRPs, wherein the cells which the UE 110 is camped on may be referred to as serving cells, including a Primary cell (Pcell) and one or more Secondary cells (Scells).

An NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

In another embodiment, the service network 120 may be an LTE/LTE-A/TD-LTE network, and the access network 121 may be an Evolved-Universal Terrestrial Radio Access Network (E-UTRAN) and the core network 122 may be an Evolved Packet Core (EPC).

An E-UTRAN may include at least one cellular station, such as an evolved NodeB (eNB) (e.g., macro eNB, femto eNB, or pico eNB), each of which may form a cell for providing mobile services to the UE 110. For example, the UE 110 may camp on one or more cells formed by one or more eNBs, wherein the cells which the UE 110 is camped on may be referred to as serving cells, including a Pcell and one or more Scells.

An EPC may include a Home Subscriber Server (HSS), Mobility Management Entity (MME), Serving Gateway (S-GW), and Packet Data Network Gateway (PDN-GW or P-GW).

It should be understood that the wireless communication network 100 described in the embodiment of FIG. 1 is for illustrative purposes only and is not intended to limit the scope of the application. For example, the wireless communication network 100 may include both a 5G NR network and a legacy network (e.g., an LTE/LTE-A/TD-LTE network, or a WCDMA network), and the UE 110 may be wirelessly connected to both the 5G NR network and the legacy network.

Figure 2:
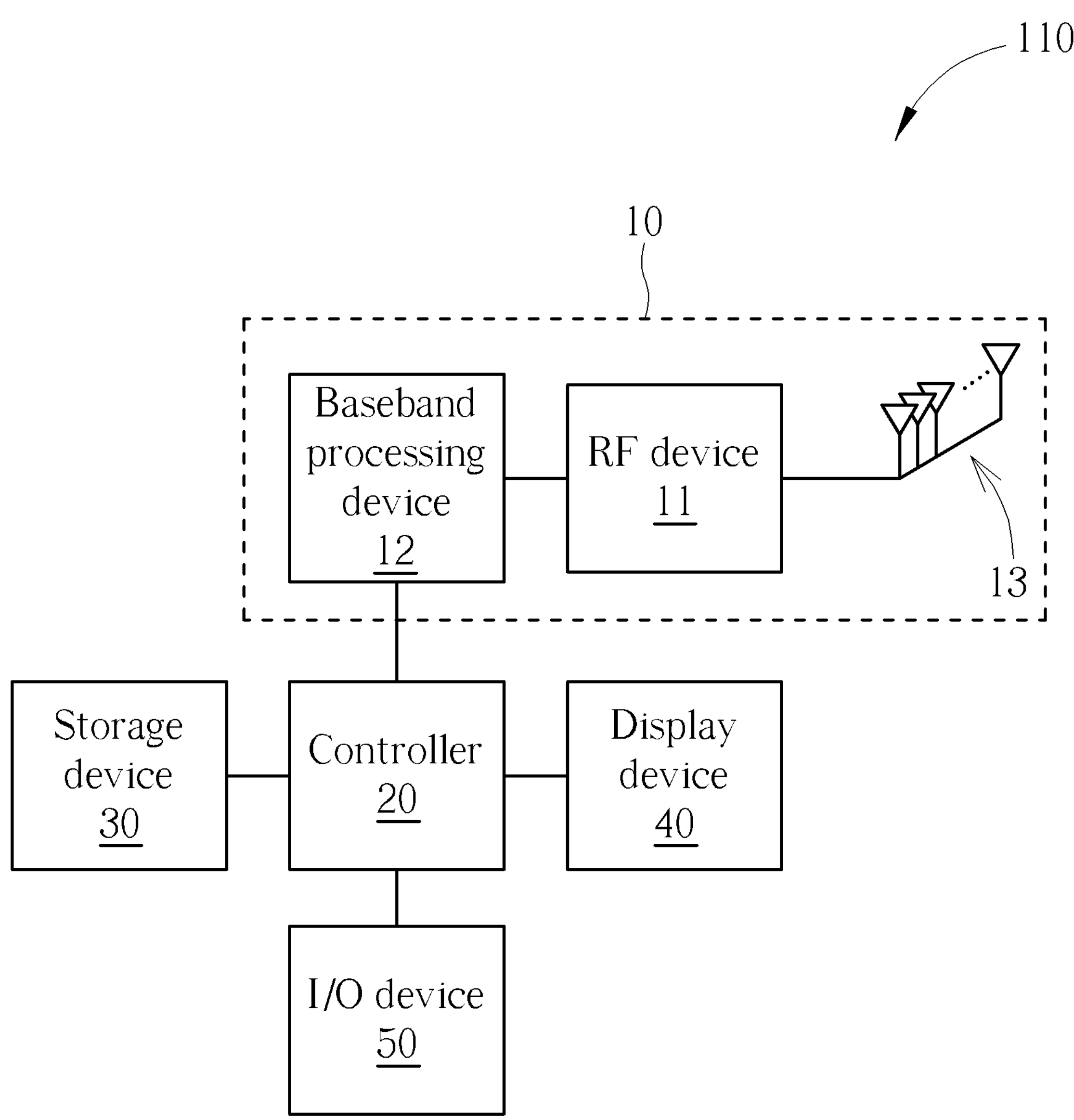
FIG. 2 is a schematic diagram of a user equipment (UE) according to an embodiment of the present invention.

FIG. 2 is a schematic diagram of the UE 110 according to an embodiment of the present invention.

As shown in FIG. 2, the UE 110 may include a wireless transceiver 10, a controller 20, a storage device 30, a display device 40, and an Input/output (I/O) device 50.

The wireless transceiver 10 is configured to perform wireless transmission and reception to and from the cells formed by one or more cellular stations of the access network 121. Specifically, the wireless transceiver 10 may include a Radio Frequency (RF) device 11, a baseband processing device 12, and antenna(s) 13, wherein the antenna(s) 13 may include one or more antennas for beamforming. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may comprise a mixer to multiply the baseband signals with a carrier oscillated in the radio frequency of the supported cellular technologies, wherein the radio frequency may be any radio frequency (e.g., 30 GHz-300 GHz for mm Wave) utilized in the 5G NR technology, or may be 900 MHz, 2100 MHz, or 2.6 GHz utilized in LTE/LTE-A/TD-LTE technology, or another radio frequency, depending on the wireless technology in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the cells formed by cellular station of the access network 121, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method for performing a cell measurement.

In another embodiment, the controller 20 may be incorporated into the baseband processing device 12, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., measurement configurations, DRX configurations, and/or measurement results), instructions, and/or program code of applications, communication protocols, and/or the method for performing a cell measurement.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MIMI) for interaction with users.

It should be understood that the components described in the embodiment of FIG. 2 are for illustrative purposes only and are not intended to limit the scope of the application. For example, the UE 110 may include more components, such as a power supply, and/or a Global Positioning System (GPS) device, wherein the power supply may be a mobile/replaceable battery providing power to all the other components of the UE 110, and the GPS device may provide the location information of the UE 110 for use by some location-based services or applications. Alternatively, the UE 110 may include fewer components. For example, the UE 110 may not include the display device 40 and/or the I/O device 50.

Figure 3:
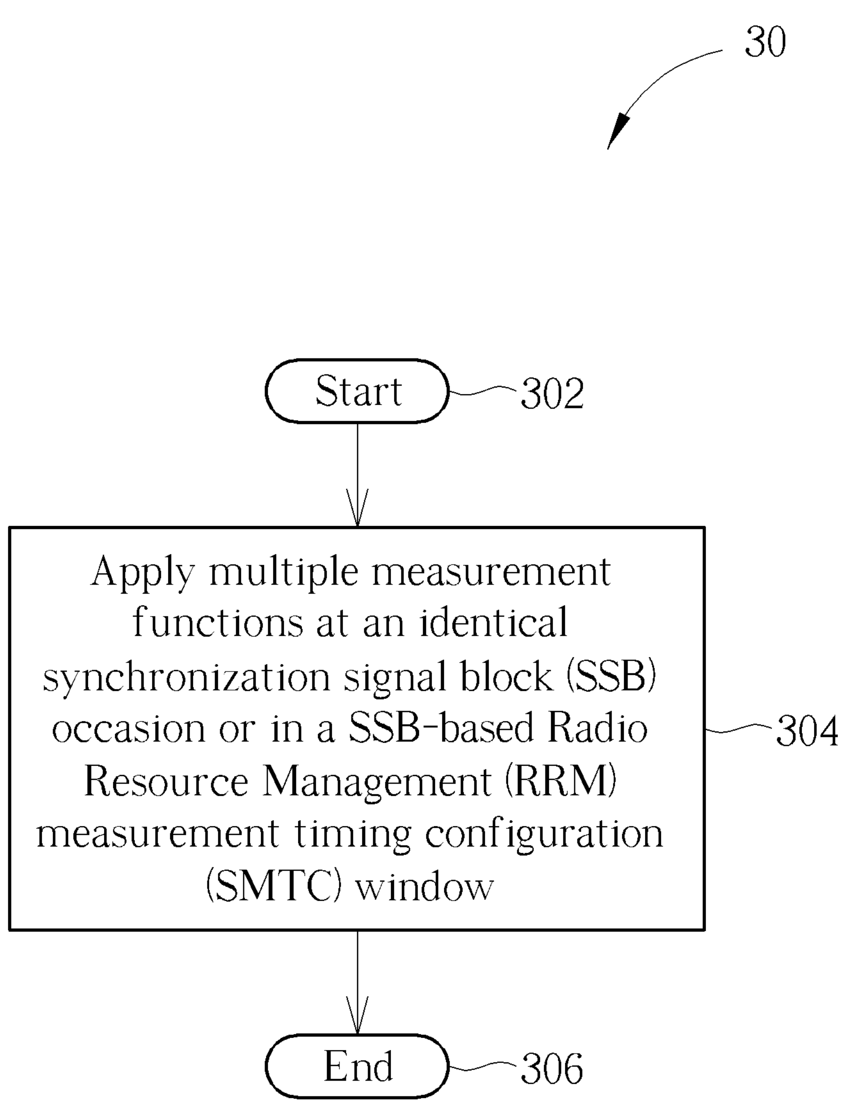
FIG. 3 is a schematic diagram of a method for performing a cell measurement according to an embodiment of the present invention.

FIG. 3 is a schematic diagram of a method 30 for performing a cell measurement according to an embodiment of the present invention. In this embodiment, the method 30 for performing the cell measurement is executed by the UE 110 with the wireless transceiver 10. The method for performing the cell measurement includes:

Step 302: Start;

Step 304: Apply multiple measurement functions at an identical synchronization signal block (SSB) occasion or in a SSB-based Radio Resource Management (RRM) measurement timing configuration (SMTC) window;

Step 306: End.

In step 304, the multiple measurement functions, e.g. a synchronization function, a beam management (BM) function, a radio link monitor (RLM) function, and a radio resource management (RRM) function, may be applied at the identical SSB occasion or in the SMTC window, wherein the SSB occasion and the SMTC window are the measurement configurations for the 5G NR network of the service network, and the SMTC may include a measurement occasion, a measurement occasion duration.

In addition, the measurement functions may be scheduled by a scheduler of the UE 110 and the measurement functions may be adopted according to different events and conditions.

Figure 4:
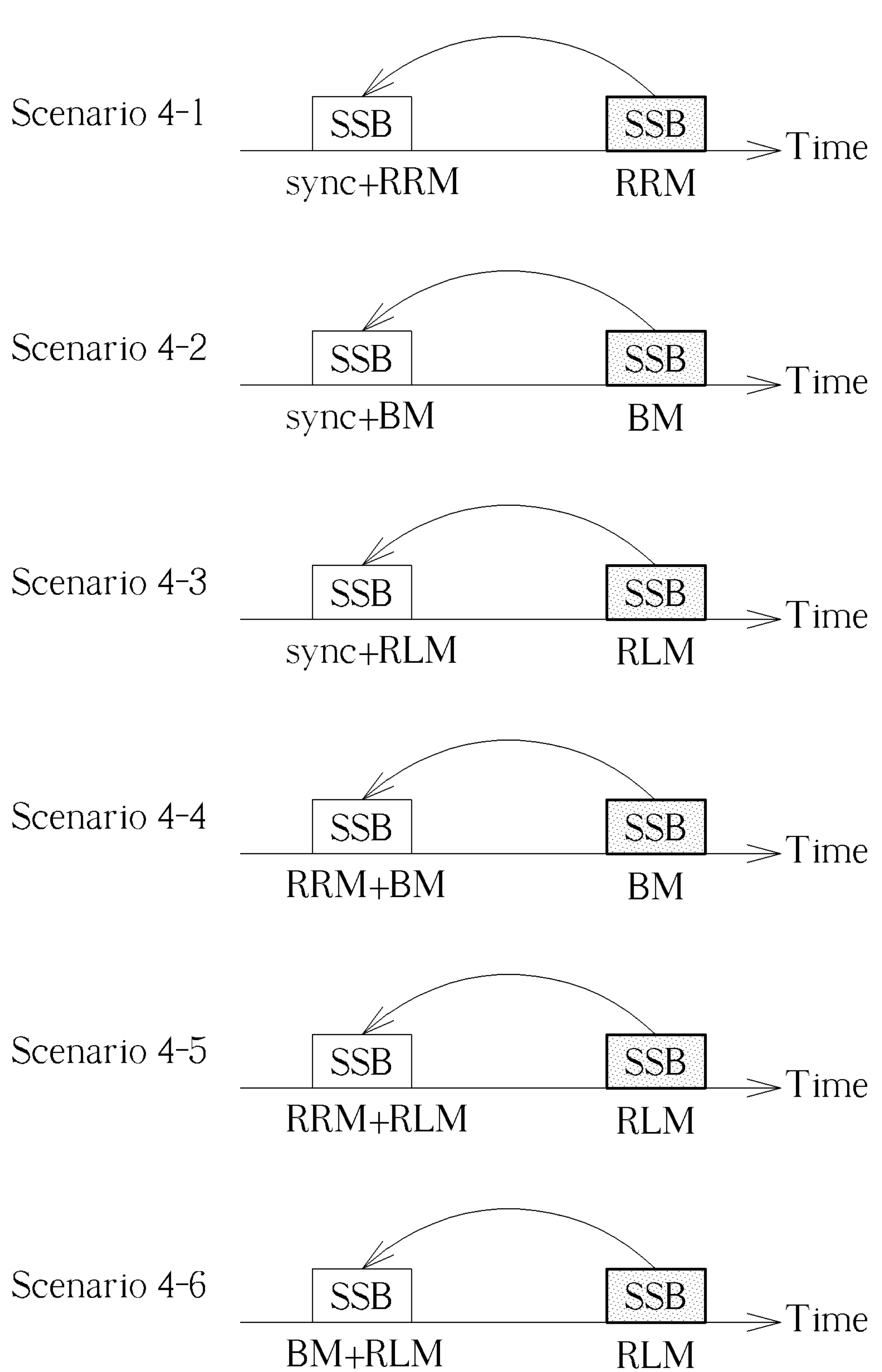
FIG. 4 is a schematic diagram of cell measurement scenarios according to an embodiment of the present invention.

FIG. 4 is a schematic diagram of cell measurement scenarios 4-1, 4-2, 4-3, 4-4, 4-5, 4-6 according to an embodiment of the present invention.

As shown in FIG. 4, the scenario 4-1 illustrates that the RRM function (the SSB with mesh in the figure) is applied at the identical SSB occasion with the synchronization function; the scenario 4-2 illustrates that the BM function (the SSB with mesh in the figure) is applied at the identical SSB occasion with the synchronization function; the scenario 4-3 illustrates that the RLM function (the SSB with mesh in the figure) is applied at the identical SSB occasion with the synchronization function; the scenario 4-4 illustrates that the BM function (the SSB with mesh in the figure) is applied at the identical SSB occasion with the RRM function; the scenario 4-5 illustrates that the RLM function (the SSB with mesh in the figure) is applied at the identical SSB occasion with the RRM function; the scenario 4-6 illustrates that the RLM function (the SSB with mesh in the figure) is applied at the identical SSB occasion with the BM function. Advantageously, the power/current consumption of the UE 110 may be reduced during the SSB occasions.

In another embodiment, three or more cell measurement methods may be applied at the identical SSB occasion or in the SMTC window, and is not limited thereto.

Notably, those skilled in the art may properly design the method and the UE according to different system requirements. For example, different cell measurement methods and a number cell measurement functions applied in the SSB occasion, may all be adjusted according to different system requirements, and not limited thereto.

In summary, the present invention provides a method and a user equipment for performing a cell measurement, which avoids unnecessary measurements at an SSB occasion or in an SMTC window, and reduces the power consumption of the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing a cell measurement, for a user equipment (UE) of a wireless communication network, comprising:

directly applying multiple measurement functions at an identical synchronization signal block (SSB) occasion or in a SSB-based Radio Resource Management (RRM) measurement timing configuration (SMTC) window;

wherein the multiple measurement functions are a combination of a synchronization function, a beam management (BM) function, a radio link monitor (RLM) function, and a radio resource management (RRM) function.

2. The method for performing a cell measurement of claim 1, wherein at least two of multiple measurement functions are applied at the identical SSB occasion or in the SMTC window.

3. A User Equipment (UE) of a wireless communication network, comprising:

a wireless transceiver, configured to perform wireless transmission and reception to and from a service network; and a controller, configured to receive a measurement configuration from the service network via the wireless transceiver, and perform a cell measurement via the wireless transceiver;

wherein the cell measurement is performed by directly applying multiple measurement functions at an identical synchronization signal block (SSB) occasion or in a SSB-based Radio Resource Management (RRM) measurement timing configuration (SMTC) window;

wherein the multiple measurement functions are a combination of a synchronization function, a beam management (BM) function, a radio link monitor (RLM) function, and a radio resource management (RRM) function.

4. The UE of a wireless communication network of claim 3, wherein at least two of multiple measurement functions are applied at the identical SSB occasion or in the SMTC window.

* * * * *